Dec. 8, 1970   M. SPERTUS   3,546,055
PACKAGING MATERIAL
Filed Dec. 13, 1968
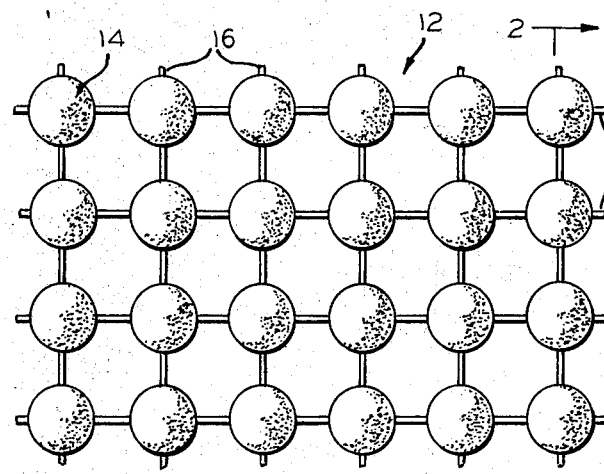
FIG.1
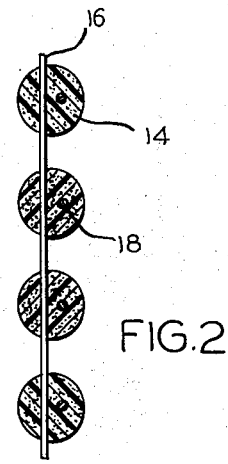
FIG.2
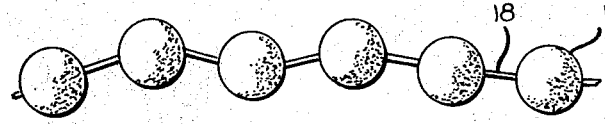
FIG.3
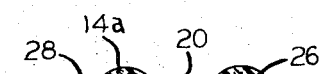
FIG.6
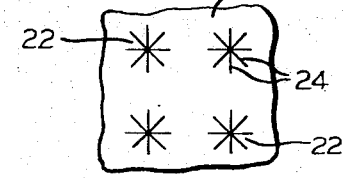
FIG.5
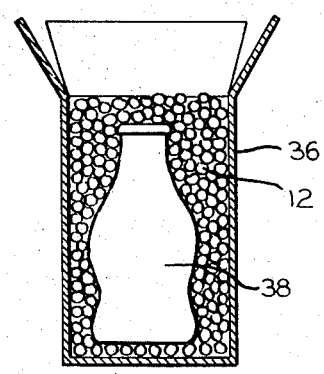
FIG.4
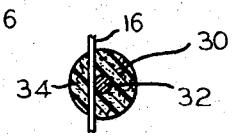
FIG.7
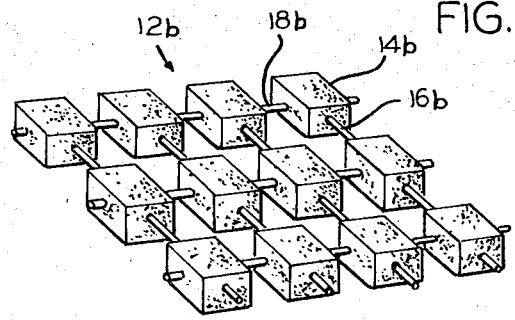
FIG.8
FIG.9
INVENTOR
MAURICE SPERTUS
BY Eli Mullin
ATTORNEY

United States Patent Office 3,546,055
Patented Dec. 8, 1970

3,546,055
PACKAGING MATERIAL
Maurice Spertus, Highland Park, Ill.
(1840 N. Clybourn Ave., Chicago, Ill. 60614)
Filed Dec. 13, 1968, Ser. No. 790,499
Int. Cl. B32b 3/10, 5/20; B65d 25/26, 65/44, 85/30
U.S. Cl. 161—55
3 Claims

ABSTRACT OF THE DISCLOSURE

Relatively small, individual, shaped pieces of shock-absorbent deformable materials such as expanded polystyrene foam are joined together in spaced relationship by flexible means to afford strands, mats or similar assemblies capable of readily conforming to the contours of an article packed or packaged in a container such as a carton.

BACKGROUND OF THE INVENTION

In recent years fragile or breakable objects have often been packed or packaged in special shock-absorbent materials, such as expanded plastics; for example, the polystyrene foam type. Said shock-absorbent members were specifically molded to the contours of the object being packed for shipment. Such packaging materials are light in weight, highly shock-absorbent and hence afford excellent protection for insulation against breakage or damage during shipment. It should be understood, of course, that the article encased in the polystyrene foam molded packaging member is packed in a suitable shipping container such as a carton or the like.

Although the above-described molded packaging members were effective for the purposes intended, heretofore their use was limited because each individual shipped article required individually molded packaging members. This, of course, was not only expensive but impractical except for use in the shipment of relatively expensive articles and/or those produced on a mass production basis. Moreover, any change in the contour or shape of the article being shipped, even of a minor nature, usually required a similar complementary change in the shape of the molded polystyrene foam packing member.

It is therefore an important object of this invention to provide a packing or packaging material of the type described hereinabove which will overcome all of the disadvantages heretofore mentioned.

Another object of this invention is to afford packaging material or devices of universal application capable of adapting to the contours of any article without requiring special molds or dies.

A further object is to provide packaging devices made up of small individual pieces of shock-absorbent materials, such as expanded plastics, which may be either joined together to afford flexible mats, strands or the like, or may be used individually without interconnection to fill the voids and spaces surrounding the packaged article inside the shipping cartons.

Yet another object is to provide a packaging material in which at least a part of the individual expanded plastic pieces are made of less expensive materials, such as, for example, paper pulp or the like. An object relating thereto is to make the individual members of the packaging devices in the shape of balls of expanded polystyrene foam, the cores of which are made of less expensive materials, such as paper pulp.

Still a further related object is to mix the expanded plastic materials (polystyrene foam) with less expensive filler materials such as paper pulp, so that particles of the paper pulp are interspersed throughout with particles of polystyrene foam.

Still another object is to afford packaging materials of the type described, in which the means for connecting the individual pieces of shock absorbent materials may be varied in form so long as they afford sufficient flexibility for the purposes intended. Objects relating thereto is to utilize strings or threads of flexible materials such as textiles, plastics or the like embedded in the shock-absorbent pieces so that the same are spaced apart sufficiently to insure suitable flexibility while still occupying sufficient areas of the contours of the packaged article to insure suitable insulation against shock, jarring or other forces which might otherwise break or damage the article during shipment.

Another related object is to form the pieces of expanded polystyrene foam in spaced relationship on one or both sides of sheets of flexible materials such as textiles, plastic, paper or the like.

With the foregoing and other objects in view which will appear as the description proceeds, the invention consists of certain novel features of construction, arrangement and a combination of parts hereinafter fully described, illustrated in the acompanying drawings and particularly pointed out in the appended claims; it being understood that various changes in the form, proportions, size and minor details of the structure may be made without departing from the spirit or sacrificing any of the advantages of the invention.

BRIEF DESCRIPTION OF THE DRAWINGS

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a mat of packaging material embodying therein the principles of my invention;

FIG. 2 is a sectional view taken on the plane of line 2—2 of FIG. 1 of the drawings and viewed in the direction indicated;

FIG. 3 is another embodiment in which the packaging material is in the form of a string or strand of polystyrene foam balls;

FIG. 4 shows another embodiment of the packaging material with balls of expanded plastic polystyrene foam formed on sheets of paper;

FIG. 5 is a fragmentary view of the paper sheet of FIG. 4 before the plastic balls have been formed thereon;

FIG. 6 is a fragmentary sectional view taken on the plane of line 6—6 in FIG. 4 of the drawings and viewed in the direction indicated;

FIG. 7 is a cross-sectional view of a ball of packaging material of another type which may be used in the forms illustrated and described;

FIG. 8 is another embodiment of the packaging mat shown in FIG. 1 of the drawings; and FIG. 9 is a sectional view of a carton containing an article packed with the packaging material comprising the subject matter of this invention.

DESCRIPTION OF THE PREFERRED EMBODIMENTS

Referring first to FIG. 1 of the drawings, reference numeral 12 indicates generally a packaging mat comprising balls or spheres 14 made of shock-absorbent material. In the embodiment chosen for illustration such materials are of the expanded plastic type and even more specifically of a plastic material known as "polystyrene foam." The balls or spheres are connected by being formed or strung on flexible strings or lines 16, shown in FIGS. 1 and 2 as being vertically positioned. Each ball 16 is further strung or formed on horizontally disposed flexible strings or lines 18 (see FIGS. 1 and 2 of the drawings). The strings 16 and 18 may be made of any suitable flexible materials such as twine, thread, plastic, wires, etc., and as shown in FIG. 2 of the drawings preferably are spaced slightly apart. However, the intersecting horizontal and vertical lines 16 and 18 may abut each other and be positioned closer to the center of the balls 14 if so desired.

The spacing of the balls 14 one from the other may vary. They should be sufficiently spaced one from the other to afford the desired flexibility necessary for the mat to assume the contour of the article being packaged or packed, and they should be close enough together to insure proper shipping insulation or shock absorbance commensurate with the anticipated handling or shipping difficulties.

Although FIGS. 1 and 2 of the drawings show the spheres 14 joined together and in the form of mats, under certain conditions and for certain articles, it may not be necessary to utilize mats, but instead strands or strings of packaging pieces such as shown in FIG. 3 of the drawings may be utilized. In such case, of course, the strings or lines 16 or 18 connecting the spheres 14 may be unidirectional.

In FIG. 4 of the drawings another embodiment is illustrated in which similar parts are designated by like numerals with the added suffix a. In this embodiment, the spheres 14a, are formed either in halves, semi-spheres as shown in FIG. 4 of the drawings, or two such semi-spheres may be molded or formed together one on both sides of a flexible sheet of material 20. In the embodiment chosen for illustration the material comprises a sheet of paper. However, it should be understood that the sheet 20 may comprise any flexible sheet such as, for example, a textile or a sheet of flexible plastic material (polyethylene, etc.).

In FIG. 5 of the drawings there is illustrated one of the processes which may be utilized in forming the packaging material embodiment of FIGS. 4 and 6 of the drawings. Here the sheet 20 is perforated at spaced apart points throughout the area of the sheet. Said perforations are achieved by forming pie-shaped slits, such as 24. Rods, tubes or other forms of expanded polystyrene foam materials are then positioned on both sides of the performations 22 and semi-spheres or balls are formed therefrom which are then joined together as at 26 by slightly heating the same. Thus, as shown in FIGS. 6, the balls may be formed on both sides of the sheet 20 with marginal portions 28 of the perforations 22 as well as the triangular portions of the sheets between the slits 23 embedded in said balls.

In FIG. 8 of the drawings yet another packaging mat embodiment is illustrated and again similar parts are designated by like numerals but this time with the added suffix b. In this embodiment shown the mat 12b is the same as the mat of FIG. 1 of the drawings except that the shape of the polystyrene foam pieces 14b are brick-shaped rather than spherical. Actually any suitable shape may be utilized although it has been found that the spherical shape is preferable because more space is filled with less material (more air spaces between the balls).

Although the type of material chosen for illustration and description in the embodiments of the invention disclosed hereinabove is preferably polystyrene foam, it should be understood that other types of materials possessing proper physical properties may be substituted therefor. Thus, for example, in FIG. 7 of the drawings there is illustrated a packaging sphere 30 having a core 32 made of inexpensive paper pulp and surrounded by an outer layer 34 of the polystyrene foam.

Another material which may be used without sacrificing to any great extent the shock-absorbing characteristics desired, is to mix particles of polystyrene foam with particles of filler such as paper pulp so that the same are interspersed. The spheres or balls are then formed from this paper-pulp expanded-plastic mixture.

In FIG. 9 of the drawings there is illustrated a carton 36 in which an article such as 38 is packaged or packed with strands or mats of the subject packaging material 12, completely surrounding the article 38 and filling the voids or spaces between the walls of the carton 36 and the article 38.

Although it has been found that strands, mats or sheets of the packaging material, such as illustrated in FIGS. 1, 3 and 4 of the drawings, are highly desirable because they are conveniently and readily handled and admirably serve the purpose required. It should be understood that, if desired, the above described polystyrene foam pieces or their equivalents as herein described may be used individually without connecting them together by merely pouring the same into the container or carton 36 to fill the voids or spaces around the packaged article.

From the above descriptions and drawings it should be apparent that I have provided a simple, inexpensive shock-absorbent packaging material especially adaptable for use in packing fragile articles for shipment in containers or cartons.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention.

What I claim and desire to procure by Letters Patent of the United States is:

1. A shock-absorbent packing device for use in packing articles for shipment in containers, comprising a plurality of substantially spherical pieces of shock-absorbent deformable material, and lines of flexible material joining said pieces together in spaced relationship, said lines having a width substantially less than the width of each of said pieces, whereby said device is enabled to encompass the article and conform substantially to the contours thereof.

2. A shock-absorbent packing device for use in packing articles for shipment in containers, comprising a plurality of lines of flexible material arranged in spaced-apart and intersecting relationship, and a plurality of discrete pieces of shock-absorbent deformable material positioned at the intersections of said lines, said lines having a width substantially less than the width of each of said pieces, whereby said device is enabled to encompass the article and conform substantially to the contours thereof.

3. A shock-absorbent packing device for use in packing articles for shipment in containers, comprising a perforated sheet of flexible material, each perforation being formed of pie-shaped segments extending inwardly from the marginal edge of the perforation, and a plurality of discrete pieces of shock-absorbent material respectively disposed in said perforations, said pie-shaped segments being respectively imbedded in said pieces.

(References on following page)

References Cited

UNITED STATES PATENTS

| | | | |
|---|---|---|---|
| 2,366,886 | 1/1945 | Van Tuyl | 206—3 |
| 3,060,513 | 10/1962 | Klink et al. | 206—46(FCM)(UX) |
| 3,066,382 | 12/1962 | Zweigle et al. | 206—46(FCM) |
| 3,131,240 | 4/1964 | Kirkpatrick | 206—46(FCM) |
| 3,339,722 | 9/1967 | Van Antwerpen | 229—14(C) |
| 3,399,797 | 9/1968 | Freeman | 217—52 |
| 1,510,595 | 10/1924 | Hodgson | 9—8 |
| 3,400,037 | 9/1968 | Sare et al. | 161—42 |

WILLIAM T. DIXSON, Jr., Primary Examiner

U.S. Cl. X.R.

150—52; 161—109, 159; 206—46; 217—53; 229—14, 90